United States Patent
Jain et al.

(10) Patent No.: US 9,462,555 B2
(45) Date of Patent: Oct. 4, 2016

(54) SYSTEMS AND METHODS FOR LOW POWER CONSUMPTION IN WIRELESS COMMUNICATION SYSTEMS

(71) Applicant: Intel Corporation, Santa Clara, CA (US)

(72) Inventors: Puneet K. Jain, Hillsboro, OR (US); Varun N. Rao, Cincinnati, OH (US); Ali T. Koc, Hillsboro, OR (US); Maruti Gupta, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 287 days.

(21) Appl. No.: 13/928,690

(22) Filed: Jun. 27, 2013

(65) Prior Publication Data

US 2014/0092799 A1    Apr. 3, 2014

Related U.S. Application Data

(60) Provisional application No. 61/707,784, filed on Sep. 28, 2012.

(51) Int. Cl.
*H04W 52/02* (2009.01)
*H04W 72/04* (2009.01)
(Continued)

(52) U.S. Cl.
CPC .......... *H04W 52/0258* (2013.01); *H04B 5/00* (2013.01); *H04B 17/318* (2015.01); *H04J 3/1694* (2013.01); *H04J 11/0086* (2013.01); *H04L 1/1812* (2013.01); *H04L 1/1864* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/5032* (2013.01); *H04L 65/4084* (2013.01); *H04L 65/60* (2013.01); *H04L 65/602* (2013.01); *H04L 65/608* (2013.01); *H04L 67/10* (2013.01);
(Continued)

(58) Field of Classification Search
None
See application file for complete search history.

(56) References Cited

U.S. PATENT DOCUMENTS 6,321,089 B1    11/2001    Han
2007/0274244 A1    11/2007    Yoon et al.
(Continued)

FOREIGN PATENT DOCUMENTS

EP    2901762    4/2014
EP    2903333 A1    8/2015

OTHER PUBLICATIONS

International Search Report and Written Opinion received for PCT Patent Application No. PCT/US2013/061304, mailed on Dec. 30, 2013, 12 Pages.

*Primary Examiner* — Jae Y Lee
*Assistant Examiner* — Tito Pham
(74) *Attorney, Agent, or Firm* — Stoel Rives LLP

(57) ABSTRACT

Methods, systems, and devices for low power consumption in wireless communication systems are disclosed herein. An evolved node B (eNodeB) is configured to provide a connection reconfiguration message to user equipment (UE) connected to the eNodeB, the connection reconfiguration message configuring the UE to indicate a power preference. The eNodeB receives assistance information from the UE. The assistance information includes a low power preference indication and a timer length, wherein the timer length indicates a preferred duration for a low power mode. The eNodeB provides, in response to receiving the assistance information, a connection release message to the UE. The connection release message includes paging discontinuous reception (DRX) information that includes the timer length.

7 Claims, 12 Drawing Sheets

(51) Int. Cl.

| | | |
|---|---|---|
| *H04W 72/12* | (2009.01) | |
| *H04W 74/00* | (2009.01) | |
| *H04L 5/00* | (2006.01) | |
| *H04L 1/18* | (2006.01) | |
| *H04W 48/14* | (2009.01) | |
| *H04W 72/02* | (2009.01) | |
| *H04W 76/02* | (2009.01) | |
| *H04W 88/02* | (2009.01) | |
| *H04B 17/318* | (2015.01) | |
| *H04W 24/10* | (2009.01) | |
| *H04W 36/00* | (2009.01) | |
| *H04W 76/04* | (2009.01) | |
| *H04W 4/00* | (2009.01) | |
| *H04W 24/08* | (2009.01) | |
| *H04W 28/02* | (2009.01) | |
| *H04W 40/24* | (2009.01) | |
| *H04W 48/16* | (2009.01) | |
| *H04W 52/04* | (2009.01) | |
| *H04W 52/14* | (2009.01) | |
| *H04B 5/00* | (2006.01) | |
| *H04J 3/16* | (2006.01) | |
| *H04L 5/14* | (2006.01) | |
| *H04L 29/06* | (2006.01) | |
| *H04L 29/08* | (2006.01) | |
| *H04W 8/08* | (2009.01) | |
| *H04W 28/08* | (2009.01) | |
| *H04W 36/22* | (2009.01) | |
| *H04W 48/20* | (2009.01) | |
| *H04L 12/24* | (2006.01) | |
| *H04W 28/16* | (2009.01) | |
| *H04J 11/00* | (2006.01) | |
| *H04W 72/00* | (2009.01) | |
| *H04W 80/10* | (2009.01) | |
| *H04W 36/08* | (2009.01) | |
| *H04W 48/18* | (2009.01) | |
| *H04W 88/18* | (2009.01) | |

(52) U.S. Cl.
CPC ............... *H04W 4/005* (2013.01); *H04W 8/08* (2013.01); *H04W 24/08* (2013.01); *H04W 24/10* (2013.01); *H04W 28/0215* (2013.01); *H04W 28/0221* (2013.01); *H04W 28/08* (2013.01); *H04W 28/16* (2013.01); *H04W 36/0061* (2013.01); *H04W 36/0083* (2013.01); *H04W 36/0088* (2013.01); *H04W 36/22* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0486* (2013.01); *H04W 72/1284* (2013.01); *H04W 74/002* (2013.01); *H04W 74/004* (2013.01); *H04W 76/022* (2013.01); *H04W 76/025* (2013.01); *H04W 76/043* (2013.01); *H04W 76/046* (2013.01); *H04W 76/048* (2013.01); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 88/18* (2013.01); *Y02B 60/50* (2013.01)

(56) References Cited

U.S. PATENT DOCUMENTS

| | | | |
|---|---|---|---|
| 2009/0233653 A1* | 9/2009 | Kim | H04W 52/04 455/574 |
| 2010/0048210 A1* | 2/2010 | Iwamura | H04W 68/00 455/436 |
| 2010/0232327 A1 | 9/2010 | Kim et al. | |
| 2011/0019602 A1 | 1/2011 | Park et al. | |
| 2011/0199898 A1* | 8/2011 | Cho | H04W 48/06 370/230 |
| 2012/0087313 A1* | 4/2012 | Yin | H04W 48/16 370/328 |
| 2012/0106456 A1* | 5/2012 | Jin | H04W 76/022 370/328 |
| 2012/0170454 A1* | 7/2012 | Takano | H04W 8/082 370/230 |
| 2012/0213137 A1* | 8/2012 | Jeong | H04W 52/0212 370/311 |

\* cited by examiner

SYSTEMS AND METHODS FOR LOW POWER CONSUMPTION IN WIRELESS COMMUNICATION SYSTEMS

RELATED APPLICATION

This application claims the benefit under 35 U.S.C. §119 (e) of U.S. Provisional Application No. 61/707,784, filed Sep. 28, 2012, which is hereby incorporated by reference herein in its entirety.

TECHNICAL FIELD

The present disclosure relates to wireless communication networks. Specifically, this disclosure relates to systems and methods for communicating and processing enhanced user equipment assistance information in wireless communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, or eNodeBs) and Radio Network Controllers (RNCs) in an E-UTRAN, which communicates with the wireless mobile device, known as user equipment (UE). A downlink (DL) transmission can be a communication from the base station (or eNodeB) to the wireless mobile device (or UE), and an uplink (UL) transmission can be a communication from the wireless mobile device to the base station.

In many wireless systems, including previous LTE systems, UEs have little or no control over certain functions and processes that prolong the UE's battery and/or achieve better performance (e.g., in terms of latency) for applications running on the UE. Rather, many such functions and processes are determined by the eNodeB without input from the UE.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As discussed above, UEs have little or no control over certain functions and processes that prolong the UE's battery and/or minimize latency for applications running on the UE. For example, a base station, such as an eNodeB, controls the RAN functions to support the UE. However, due to the proliferation of smartphones and other mobile devices that run diverse mobile internet applications, the UE can achieve power savings and latency requirements more effectively if it is allowed to communicate its preferences, constraints, and/or requirements to the eNodeB in the form of UE assistance information. Additionally, eNodeBs that effectively handle and process the UE assistance information can maximize power saving of the UE, reduce latency, and/or improve quality of service for users on one or more UEs utilizing supporting communication infrastructure. Although the present disclosure discusses UEs, one skilled in the art will recognize that the present disclosure and teachings also apply to machine-to-machine communication.

Figure 1:
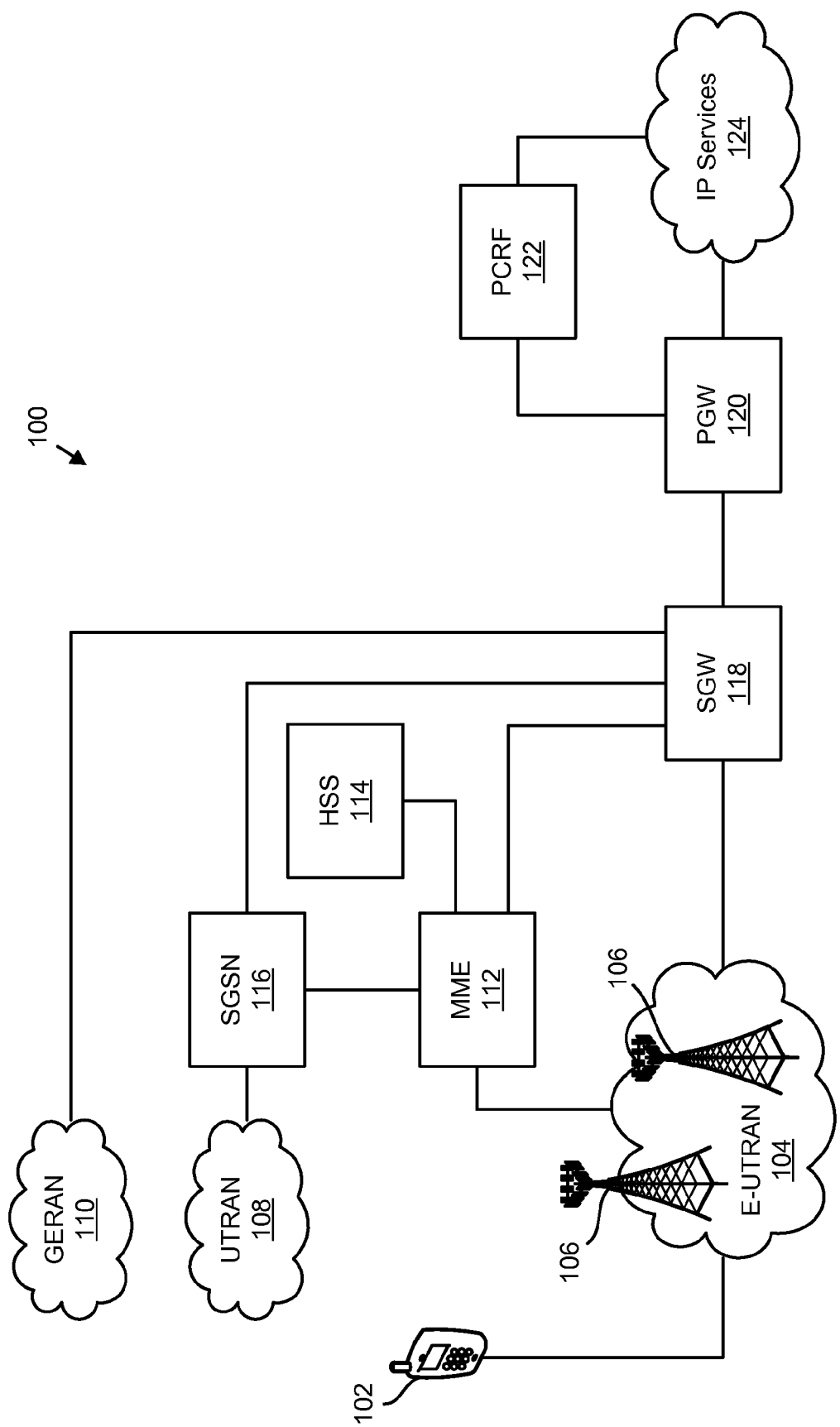
FIG. 1 is a schematic diagram illustrating architecture of a communication system for 3GPP access consistent with embodiments disclosed herein.

FIG. 1 illustrates an example communication system 100 for 3GPP access. The communication system 100 is an example of infrastructure and/or architecture based on architecture illustrated in section 4 of 3GPP TS 23.401. The architecture and individual components are given by way of example only. One of skill in the art will recognize that aspects of the disclosure are applicable to communication systems with different architectures and/or that implement other standards.

The communication system 100 illustrates a variety of components that may be used to provide communication services or access to user equipment 102. The communication system 100 includes E-UTRAN 104, which includes a plurality of eNodeBs 106. A universal terrestrial radio access network (UTRAN) 108 and a global system for mobile communications (GSM) enhanced data rates GSM evolution (EDGE) radio access network (GERAN) 110 are also included as examples for backwards compatibility.

The communication system 100 also includes a mobility management entity (MME) 112, a home subscriber server (HSS) 114, and a serving general packet radio service (GPRS) support node (SGSN) 116. A serving gateway (SGW) 118, a packet data network gateway (PGW) 120, and a policy and charges rules function (PCRF) 122 provide access to an operator's internet protocol (IP) services 124. Example interfaces for communication between the various components are also indicated.

Figure 2:
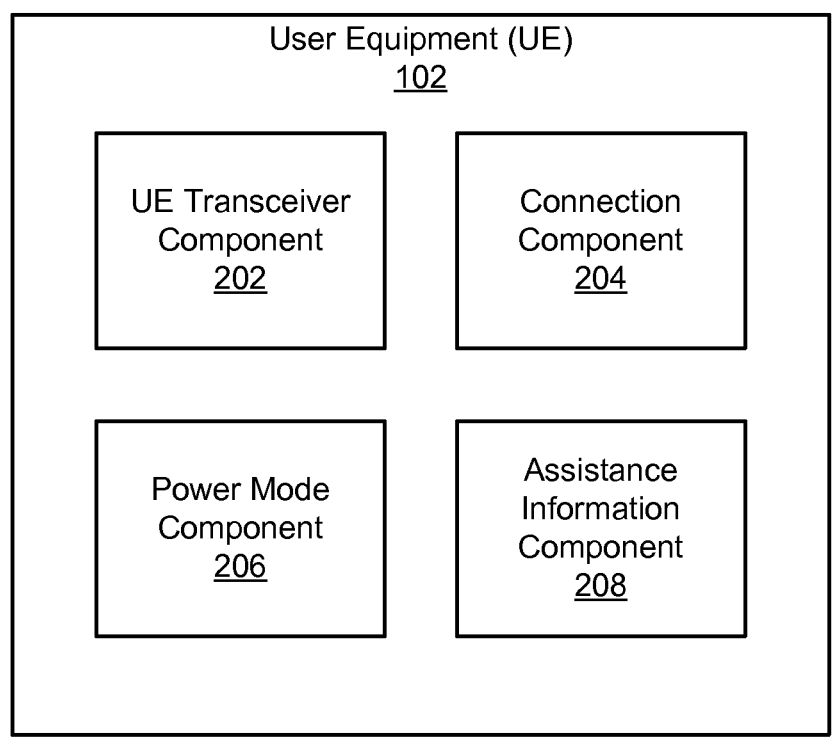
FIG. 2 is a block diagram of components of a UE consistent with embodiments disclosed herein.

FIG. 2 is a block diagram illustrating example components of a UE 102 that is configured to provide assistance information. The UE 102 may include any type of communications and/or computing device. Example UE 102 include smartphones, personal digital assistants (PDAs), tablet computers, notebook computers, Ultrabook™ computers, or the like. The UE 102 is depicted including a UE transceiver component 202, a connection component 204, a power mode component 206, and an assistance information component 208. The UE 102 may include fewer, alternate, and/or additional components in some embodiments.

The UE transceiver component 202 is configured to communicate with an eNodeB 106 or other radio. The UE transceiver component 202 may include one or more antennas and/or processing circuitry to send and receive messages wirelessly. The UE transceiver component 202 may operate to send and receive messages on behalf of other components or a processor of the UE 102. According to one embodiment, the UE transceiver component 202 may be powered off to reduce energy consumption of the UE 102.

The connection component 204 stores and/or negotiates connection details for the UE 102. In one embodiment, the connection component 204 stores information regarding a communication session with an eNodeB 106. For example, the connection component 204 may store an identifier for an eNodeB 106 or other component of a communication system 100. Additionally, the connection component 204 may be configured to receive messages via the UE transceiver component 202 regarding establishing a connection, reconfiguring a connection, and/or releasing a connection with the communication system 100. The connection component 204 may modify or update connection information based on information received in a message.

The power mode component 206 controls the UE 102 to selectively place the UE 102 in one or more power modes. The power mode component 206 may power off a portion of the UE to reduce power consumption. For example, the power mode component 206 may power off the UE transceiver component 202, place a processor in an idle mode, or control power used by other components of the UE 102. In one embodiment, the power mode component 206 causes the UE to enter a low power mode by powering off transceiver circuitry and processing circuitry that is not required for maintaining radio state information of the UE. Different power modes may be selected to result in different combinations of energy savings and performance benefits. In one embodiment, the power mode component 206 may be configured to follow a schedule, timer, or cycle to maintain the UE 102 in a power state expected by the communication system 100.

The power mode component 206 may also determine a preferred current power mode. For example, the power mode component 206 may receive information regarding tasks or resource usage on the UE 102 and determine a preferred current power mode. For example, the power mode component 206 may determine that current resource usage or tasks by the UE 102 are small enough that the UE 102 may be placed in a low power mode for a period of time. For example, the power mode component 206 may determine that a processor, UE transceiver component 202, or other component of the UE 102 will not need to perform any task for a period of time. The power mode component 206 may determine, based on the lack of tasks to perform or resources to be used on the UE 102, that the UE 102 may be placed in low power mode.

The power mode component 206 may also determine an amount of time for the UE 102 to be within a low power mode. For example, if the power mode component 206 determines that the UE transceiver component 202 will not likely need to send or receive messages for a few seconds, the power mode component 206 may determine a timer length for the UE 102 that indicates a preferred duration to be in the low power mode.

The assistance information component 208 determines assistance information to be sent to a communication system 100. The assistance information component 208 may cause the UE transceiver component 202 to send the assistance information in a message to an eNodeB 106 or other radio. In one embodiment, the assistance information component 208 receives preferences from other components of the UE 102 and forwards these preferences to an eNodeB 106 or other portion of a communication system 100. The eNodeB 106 and/or the communication system 100 may allow or instruct the UE 102 to enter a lower power mode based on these preferences.

In one embodiment, the assistance information component 208 includes a power preference indication in the assistance information based on a power preference determined by the power mode component 206. For example, the assistance information component 208 may send a low power preference indication to an eNodeB 106 in response to the power mode component 206 determining that a lower power mode is preferred. The assistance information component 208 may include a timer length in the assistance information. The timer length may indicate to the communication system 100 or eNodeB 106 a length of time during which the UE 102 will enter a low power mode and thus be unavailable to receive and/or send messages. This timer length may be used by the network (such as eNodeB 106) to derive a DRX timer in an idle mode or a connected mode or the timer length may indicate a value for the DRX timer itself.

Figure 3:
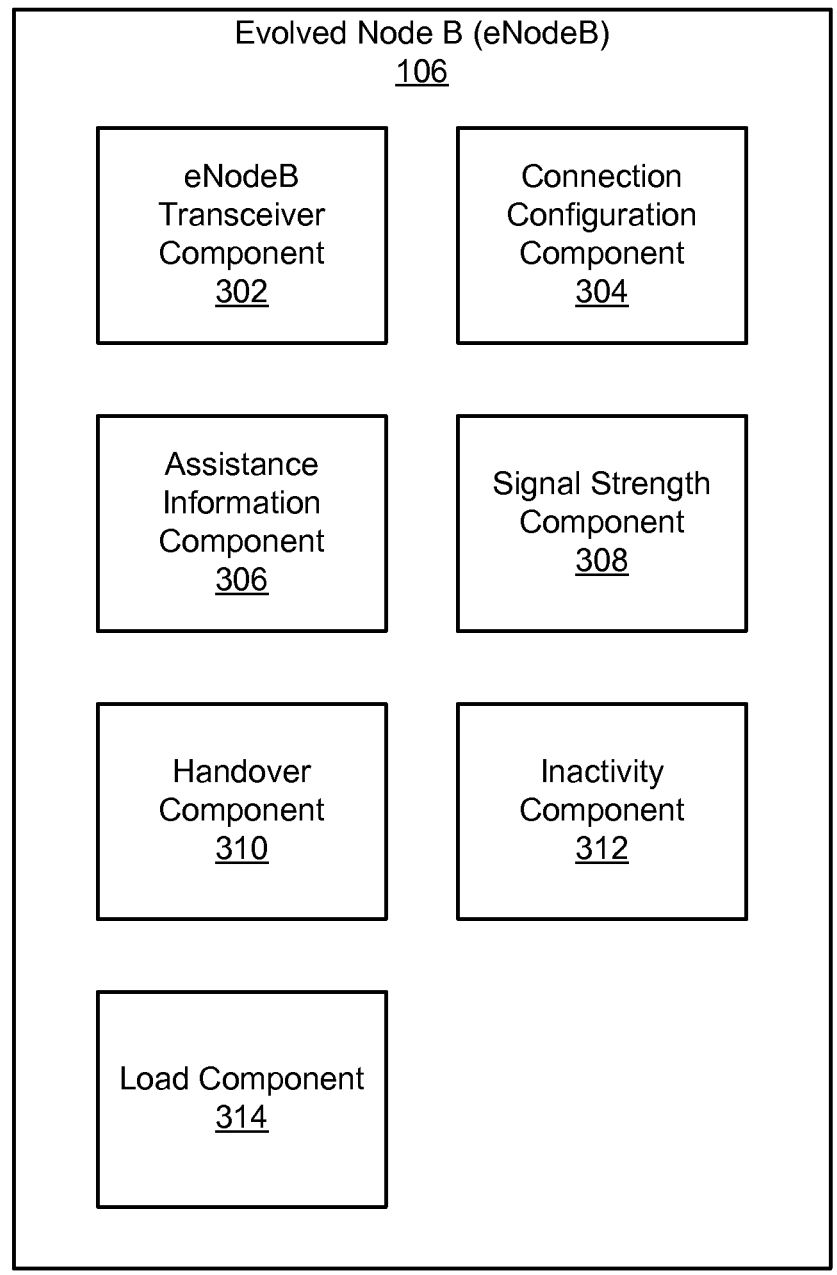
FIG. 3 is a block diagram of components of an eNodeB consistent with embodiments disclosed herein.

FIG. 3 is a block diagram illustrating example components of an eNodeB 106 that is configured to receive and process assistance information. In other embodiments, the eNodeB 106 may include any type of radio and/or RNC in a RAN. The eNodeB 106 is depicted including an eNodeB transceiver component 302, a connection configuration component 304, an assistance information component 306, a signal strength component 308, a handover component 310, an inactivity component 312, and a load component 314. The eNodeB 106 may include fewer, alternate, and/or additional components in some embodiments. For example, the eNodeB 106 may include other components to implement functions, services, and interfaces defined by a 3GPP or other communication standard.

The eNodeB transceiver component 302 is configured to communicate with a UE 102 or other component of a communication system 100. The eNodeB transceiver component 302 may include one or more antennas and/or processing circuitry to send messages to and receive messages from the UE 102 wirelessly. The eNodeB transceiver component 302 may operate to send and receive messages based on instruction or information from other components or a processor of the eNodeB 106.

The connection configuration component 304 stores and determines connection details for the UE 102 and/or additional UEs connected to the eNodeB 106. In one embodiment, the connection configuration component 304 stores information regarding a communication session with a UE 102. For example, the connection configuration component 304 may store an identifier for a UE 102 as well as session information for the UE 102. The connection configuration component 304 may be configured to configure a connection with a UE 102 so as to establish, reconfigure, or release a connection with the UE 102. In one embodiment, the connection configuration component 304 utilizes radio resource control (RRC) messaging to configure the UE 102 and/or a connection with the UE 102. The connection configuration component 304 may modify or release a connection with the UE 102 based on information received from an MME 112, SGW 118, or other component of the communication system 100.

The assistance information component 306 receives and processes assistance information from a UE 102. For example, the assistance information component 306 of the eNodeB 106 may receive assistance information determined by the assistance information component 208 of the UE 102. The assistance information component 306 may receive assistance information that a power preference indication for the UE 102. The assistance information may include a timer length that indicates to the eNodeB 106 a length of time during which the UE 102 will enter a low power mode and thus be unavailable to receive and/or send messages. This timer length may be used by the eNodeB 106 to derive a DRX timer in an idle mode or a connected mode or the timer length may indicate a value for the DRX timer itself.

The assistance information component 306 may cause the connection configuration component 304 to modify, release, and/or reestablish a connection with a UE 102 based on the assistance information received from the UE 102. For example, the assistance information component 306 may receive assistance information from the UE 102 through the eNodeB transceiver component 302 and the connection configuration component 304 may reconfigure or release a connection with the UE 102 based on the assistance information.

The signal strength component 308 determines a signal strength of the UE 102. The signal strength component 308 may determine the signal strength of the signal transmitted by the UE 102 as received by the eNodeB 106 and/or may determine the signal strength from the eNodeB 106 as received at the UE 102. In one embodiment, the signal strength component 308 may determine a received signal strength indicator (RSSI) for the UE 102. The signal strength component 308 may determine the signal strength based on tests performed by the UE 102 and/or by the signal strength component 308 of the eNodeB 106.

In one embodiment, the signal strength component 308 compares the signal strength of the UE 102 with a handover threshold. The handover threshold may indicate a signal strength at which the UE 102 should be switched to a new cell or radio, such as a new eNodeB 106. In one embodiment, the signal strength component 308 determines whether the signal strength of the UE 102 is near the handover threshold, even if it is not at the handover threshold. For example, the signal strength component 308 may determine whether the signal strength is within a specific range of the handover threshold. The range may include that the signal strength is within a specific number of decibels (dBs). Alternatively, the range may include a range of RSSI values based on arbitrary units surrounding the handover threshold.

The handover component 310 controls a handover procedure for handing the UE 102 to a new cell or new eNodeB 106. The handover component 310 may communicate with the UE 102, MME 112, SGW 118, or other component to transfer a communication session for the UE 102 to another cell, eNodeB 106, or the like. In one embodiment, the handover component 310 stores and/or configures a number of settings for handing over the UE 102. For example, the handover component 310 may store or configure a handover threshold, information for a target eNodeB 106 where the UE 102 will be handed over, or the like.

In one embodiment, the handover component 310 modifies the handover procedure or the settings for a handover procedure based on the assistance information. In one embodiment, the handover component 310 reduces a handover threshold or determines that a handover procedure will not be performed. As one example, the handover component 310 may reduce a handover threshold for the UE 102 in response to receiving assistance information from the UE 102 comprising a low power preference indication. As another example, the handover component 310 may determine that no handover procedure will be performed for the UE 102 in response to receiving assistance information from the UE 102 comprising a low power preference indication.

The inactivity component 312 tracks activity of a UE 102. In one embodiment, the inactivity component 312 starts an inactivity timer for the UE 102 each time communication with the UE 102 stops. For example, the inactivity timer may be started after the eNodeB 106 receives the end of a message or communication stream from the UE 102. The inactivity component 312 may determine that the UE 102 can be placed into a low power mode if the inactivity timer expires.

In one embodiment, the inactivity component 312 determines whether an inactivity timer is about to expire in response to the eNodeB 106 receiving assistance information. If the timer is about to expire, the inactivity component 312 may indicate to the connection configuration component 304 that the inactivity timer is about to expire. In one embodiment, the connection configuration component 304 then determines that a connection with the UE 102 can be released. Similarly, the connection configuration component 304 may also wait to see if the signal strength is low, as determined by the signal strength component 308, before releasing the UE 102. Releasing the UE 102 when the signal strength is low and the inactivity timer is about to expire may reduce processing overhead for handing over the UE 102 when the UE 102 will just go into a low power mode or idle mode soon anyway.

The load component 314 determines a load of the eNodeB 106. For example, the load component 314 may determine at what percent of capacity the eNodeB 106 is operating. For example, if the eNodeB 106 is near full capacity, the load component 314 may determine that the eNodeB 106 is overloaded. Similarly, if the eNodeB 106 is not able to respond to requests within a defined time period, the load component 314 may determine that the eNodeB 106 is overloaded. One of skill in the art will recognize other methods and systems for determining a load of an eNodeB 106.

In one embodiment, the load component 314 indicates a load status of the eNodeB 106 to the connection configuration component 304. For example, the load component 314 may determine that the eNodeB 106 is overloaded. The connection configuration component 304 may then use the load status of the eNodeB 106 in conjunction with the assistance information, or other information, to determine how to handle a connection with a UE 102. In one embodiment, the connection configuration component 304 releases or modifies a connection with a UE 102 in response to receiving assistance information that includes a low power indication and the load component 314 determining that the eNodeB 106 is overloaded. For example, release of a connection with a UE 102 that indicates a preference for a low power state may be an effective way of prioritizing a load for the eNodeB 106. The low power indication may indicate that the UE 102 will not need resources any time soon, and releasing the UE 102 may allow the eNodeB 106 to better serve other UEs 102 that are requesting resources.

Figure 4:
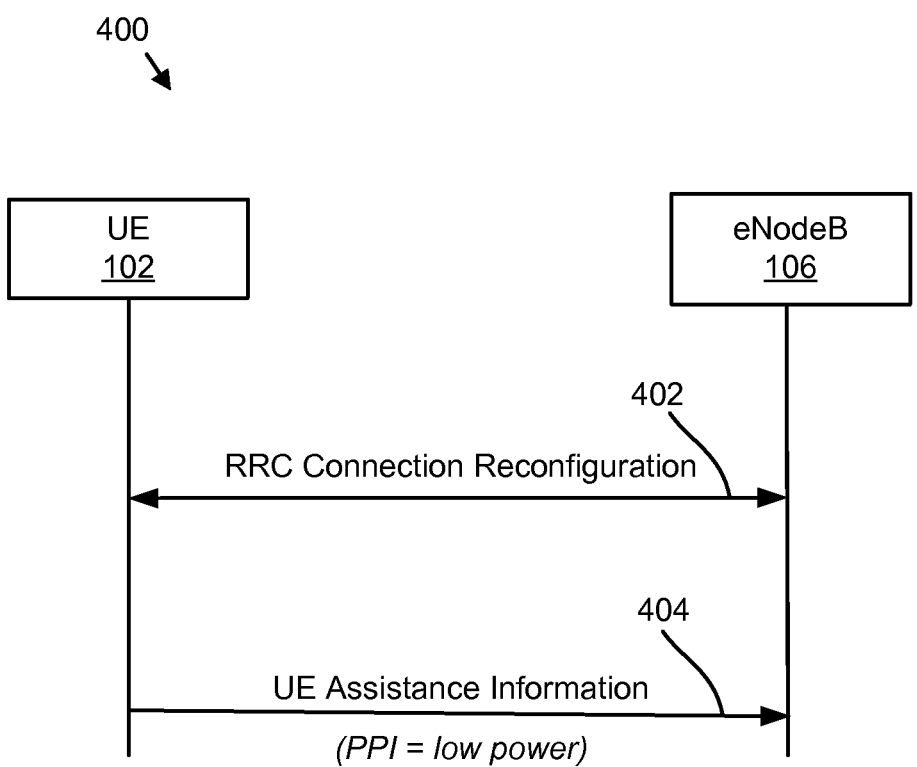
FIG. 4 is a diagram of a communication timeline illustrating communication between a UE and an eNodeB for obtaining assistance information consistent with embodiments disclosed herein.

FIG. 4 is a diagram of a communication timeline 400 illustrating communication between a UE 102 and an eNodeB 106 for obtaining and/or providing assistance information. The communication timeline 400 reflects discussion of UE assistance information as provided in 3GPP TS 36.331 section 5.6.10. A purpose of this procedure is to inform E-UTRAN 104 (e.g., eNodeB 106) of the UE's 102 power saving preference. Upon configuring the UE 102 to provide power preference indications, according to one embodiment, the E-UTRAN 104 (or eNodeB 106) considers that the UE 102 does not prefer a configuration primarily optimized for power saving until the UE 102 explicitly indicates that it does prefer a power saving configuration. In other embodiments, however, the E-UTRAN 104 assumes that the UE 102 prefers a default configuration for power savings when it configures and enables the UE 102 for power preference indication.

The eNodeB 106 and the UE 102 reconfigure 402 a connection for the UE 102. The connection may be reconfigured 402 using RRC messaging. The connection may be reconfigured 402 to allow the UE 102 to provide power preference indications to the eNodeB 106. For example, the connection configuration component 304 of the eNodeB 106 may send an RRC Connection Reconfiguration message to configure the UE 102 to send power preference indications. The connection component 204 of the UE 102 may receive the reconfiguration message, reconfigure the UE 102 based on the message, and send an RRC Connection Reconfiguration Complete message to confirm that the connection and/or the UE 102 has been reconfigured.

The UE 102 sends 404 UE assistance information to the eNodeB 106 including a power preference indicator (PPI) to indicate a power preference of the UE 102. The UE 102 may send 404 a UE assistance information message that includes a PPI for low power preference indication. The UE 102 may send 404 the UE assistance information in response to the power mode component 206 determining that the UE 102 prefers a low power state. For example, the power mode component 206 may determine that there will be no need for sending or receiving messages for a period of time and may determine that a low power state could be entered to reduce power consumption.

A UE 102 that is configured to provide power preference indications and is in a connected state (such as in an RRC_CONNECTED state) may initiate a procedure for providing assistance information. The procedure for providing assistance information may be performed in several cases, including upon the UE 102 being configured to provide power preference indications and upon a change of power preference. For example, if the UE 102 is configured to provide power preference indications, the UE 102 may initiate an assistance information procedure if either (1) the UE 102 has not yet sent a UE assistance information message since it was configured to provide power preference indications by the eNodeB 106 or (2) a current power preference for the UE 102 is different from one indicated in the last transmission of a UE assistance information message and a message timer (such as timer T340 discussed in 3GPP TS 36.331) is not running. The UE 102 may then initiate transmission of the UE assistance information message with a corresponding power preference indication.

If the UE 102 prefers a configuration primarily optimized for power savings, the UE 102 sets a power preference indication to indicate low power consumption (e.g., set powerPrefIndication to lowPowerConsumption). If the UE 102 does not prefer a configuration primarily optimized for power savings, the UE 102 may set a power preference to indicate normal power consumption (e.g., set powerPrefIndication to normal). The UE 102 may also restart a timer value to trigger initiation of the assistance information procedure when the timer expires. For example, the UE 102 may restart timer T340 to a value indicated by a powerPrefIndication value indicated by the UE 102 or the eNodeB 106. The UE 102 may then submit the assistance information as part of a UE assistance information message to lower layers for transmission.

The eNodeB 106 may receive the assistance information and may process the information to reduce power consumption for the UE 102 and/or reduce load on a communication system 100. FIGS. 5, 6, 7, 8, 9, 10 and 11 illustrate examples of enhanced assistance information and/or usage of the assistance information by the eNodeB 106 and/or other portions of the communication system 100.

Figure 5:
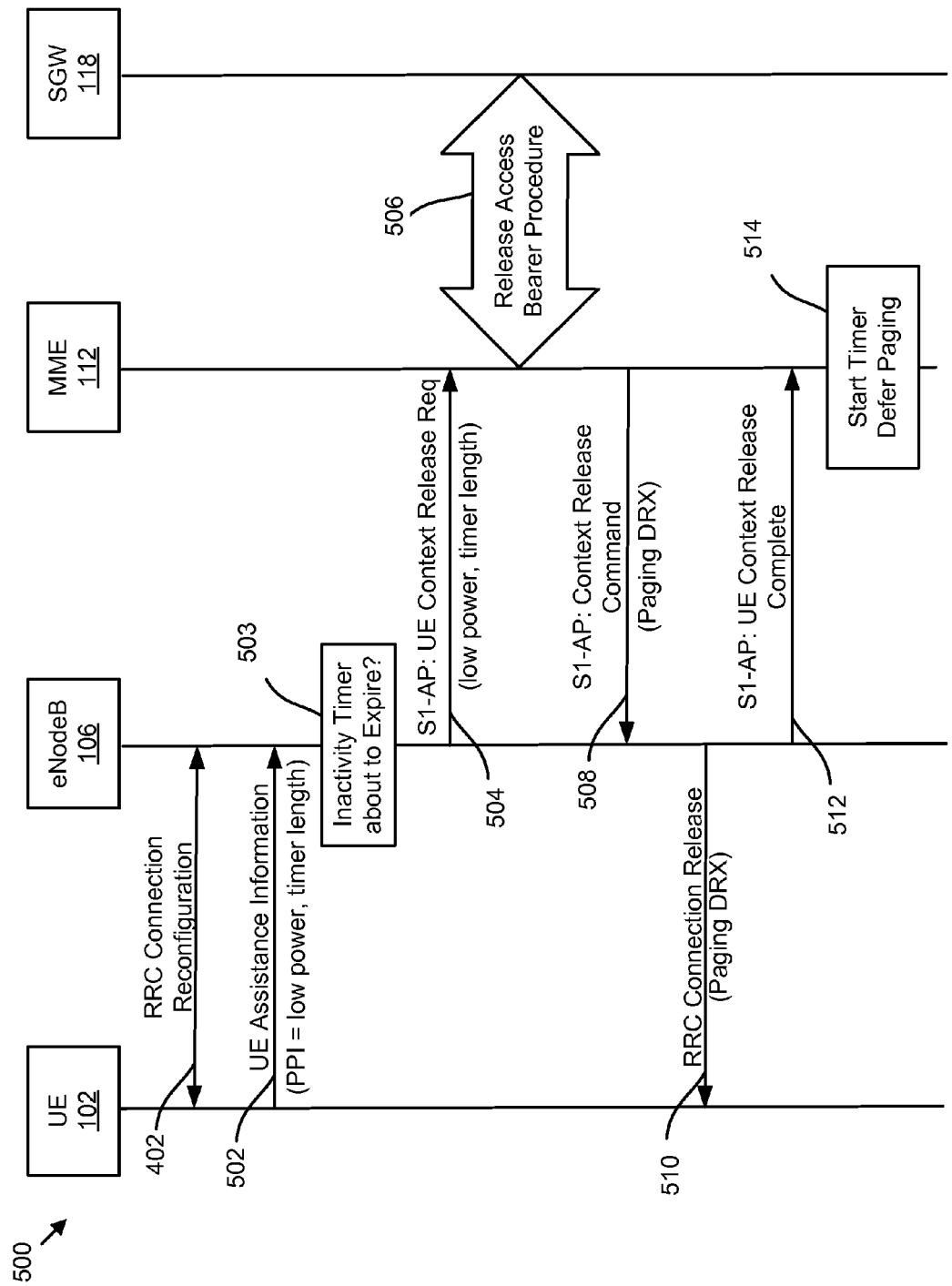
FIG. 5 is a diagram of a communication timeline illustrating communication to obtain and process enhanced assistance information to release a connection with a UE consistent with embodiments disclosed herein.

FIG. 5 is a diagram of a communication timeline 500 illustrating communication between a UE 102, an eNodeB 106, an MME 112, and an SGW 118 for obtaining and processing enhanced assistance information to release a connection with a UE 102.

The eNodeB 106 and the UE 102 reconfigure 402 a connection for the UE 102. Reconfiguration 402 of the connection may be performed in a manner similar to that discussed in relation to FIG. 4.

The UE 102 sends 502 UE assistance information to the eNodeB 106 indicating a power preference of the UE 102. The UE 102 may send 502 assistance information in a manner similar to that discussed in relation to sending 404 assistance information as shown in FIG. 4. However, the UE 102 may also send 502 assistance information that includes a timer length to indicate how long the UE 102 prefers to be in the low power state. For example, the power mode component 206 may determine that the UE 102 should be in a low power state for a specific period of time. This timer length may be used by a network to derive a DRX timer in an idle mode or a connected mode or the timer length may indicate the DRX timer value itself. This period of time may be included in the assistance information sent 502 to the eNodeB 106. Similarly, the UE 102 may also determine preferred paging DRX information for inclusion in the assistance information and send 502 the preferred paging DRX to the eNodeB 106.

The eNodeB 106 may determine 503 whether an inactivity timer for the UE 102 is about to expire. The inactivity timer may be the inactivity timer run by the inactivity component 312. In one embodiment, the eNodeB 106 determines whether the inactivity timer is about to expire in response to receiving the assistance information sent 502 by the UE 102. The eNodeB 106 may determine that the inactivity timer for the UE is about to expire based on the inactivity timer falling below or reaching a preconfigured threshold value.

The eNodeB 106 may request 504 an S1 and UE context release for the UE 102 with the MME 112. The eNodeB 106 may be configured to request 504 an S1 and UE context release in response to receiving assistance information from UE 102 and/or in response to the eNodeB 106 may be configured to request 504 an S1 and UE context release in response to determining 503 that the UE inactivity timer is about to expire. If the UE inactivity timer (running at the eNodeB 106) is about to expire, the eNodeB 106 may request S1 and UE context release. The request 504 may include the assistance information. For example, the low power indication and/or timer length may be included in the request 504. The request 504 may be sent to the MME 112 using the S1 application protocol (S1-AP). In one embodiment, the eNodeB 106 requests 504 the context release by sending a UE Context Release Request message indicating a new cause of the release (such as Cause=UE low power consumption mode).

The MME 112 and SGW 118 perform 506 a release access bearer procedure in response to receiving the context release request. The release access bearer procedure may be performed 506 to release an S1 session with the UE 102. For example, the MME 112 and SGW 118 may perform the S1 release procedure as disclosed in 3GPP TS 23.401 section 5.35. Performing 506 of the release procedure may include the MME 112 sending a release access bearer request. For example, the release access bearer request may request release of all S1-U bearers for the UE. Performing 506 the release procedure may also include the SGW 118 sending a release access bearer response message confirming release of all eNodeB 106 related information.

The MME 112 commands 508 release of S1 for the UE 102 by instructing the eNodeB 106 to release the UE 102. The MME 112 may command 508 release by providing a context release command message to the eNodeB 106 in response to performance 506 of the release access bearer procedure. The context release command message may indicate the cause of the release (such as Cause=UE low power consumption mode). The context release command may include paging discontinuous reception (DRX) information for configuring the eNodeB 106 and/or the UE 102 for paging DRX. In one embodiment, the paging DRX information includes a timer length based on the timer length that was provided by the UE 102 and/or may include paging DRX information provided by the UE 102. For example, the timer length may be the same as the timer length provided by the UE 102 in the assistance information. In one embodiment, the MME 112 provides long paging DRX information to place the UE 102 on a long paging DRX cycle. The context paging DRX information may include information for both a long DRX cycle and the timer length based on the timer length provided by the UE 102. For example, the timer length may indicate how long the UE will stay in a low power mode.

The eNodeB 106 sends 510 an RRC connection release message to the UE 102 to release a session with the UE 102. The connection release message may configure the UE 102 to release bearer or other information for a user data session on the UE 102. The UE 102 may also change from a connected state to an idle or paging state. The connection release message may be sent 510 including the paging DRX (or long paging DRX) information received from the MME 112. The paging DRX information may define a paging interval at which the UE 102 checks for incoming control or user data. The paging DRX information may include the timer length as initially determined and sent 502 by the UE 102 in the assistance information. The UE 102 may then power off a receiver or other component of the UE 102 to enter a low power mode for the timer length.

The eNodeB 106 may also send 512 a UE context release complete message to the MME 112 to indicate that the UE 102 has been released. The sent 512 message confirms the S1 release of the UE 102. This releases the signaling connection between the MME 112 and the eNodeB 106 for the released UE 102.

The MME 112 may start 514 a timer based on the timer length. The MME 112 may defer paging until the timer expires and the UE 102 will be available for paging. The timer may be started 514 with a length defined by the UE 102, or another length defined in the MME 112 or kept in UE subscription data in an HSS 114 and downloaded to the MME 112 during attachment. In one embodiment, the timer may be started 514 after receipt of the context release request sent 504 by the eNodeB 106.

The method and communication illustrated in the timeline 500 of FIG. 5 may be helpful for maximizing energy usage by the UE 102 and/or releasing a load on the eNodeB 106, MME 112, SGW 118, and/or other portions of a communication system 100. For example, by allowing a UE 102 to select a timer length, the amount of time the UE 102 can remain in a low power state can be increased. For example, if the UE 102 determines that it can be in a low power state longer than is generally defined by a communication system 100, the UE 102 can stay asleep longer. Furthermore, even if the timer length is less, the UE 102 may be able to enter a low power mode and still keep requirements for frequent paging that may not otherwise be possible. For example, the UE 102 may instead remain in an active mode or connected mode because requirements for frequent paging may not be met in an idle or disconnected mode. Furthermore, release of the UE 102 by the communication system 100 may allow for a reduced load on the communication system 100 and its components.

Figure 6:
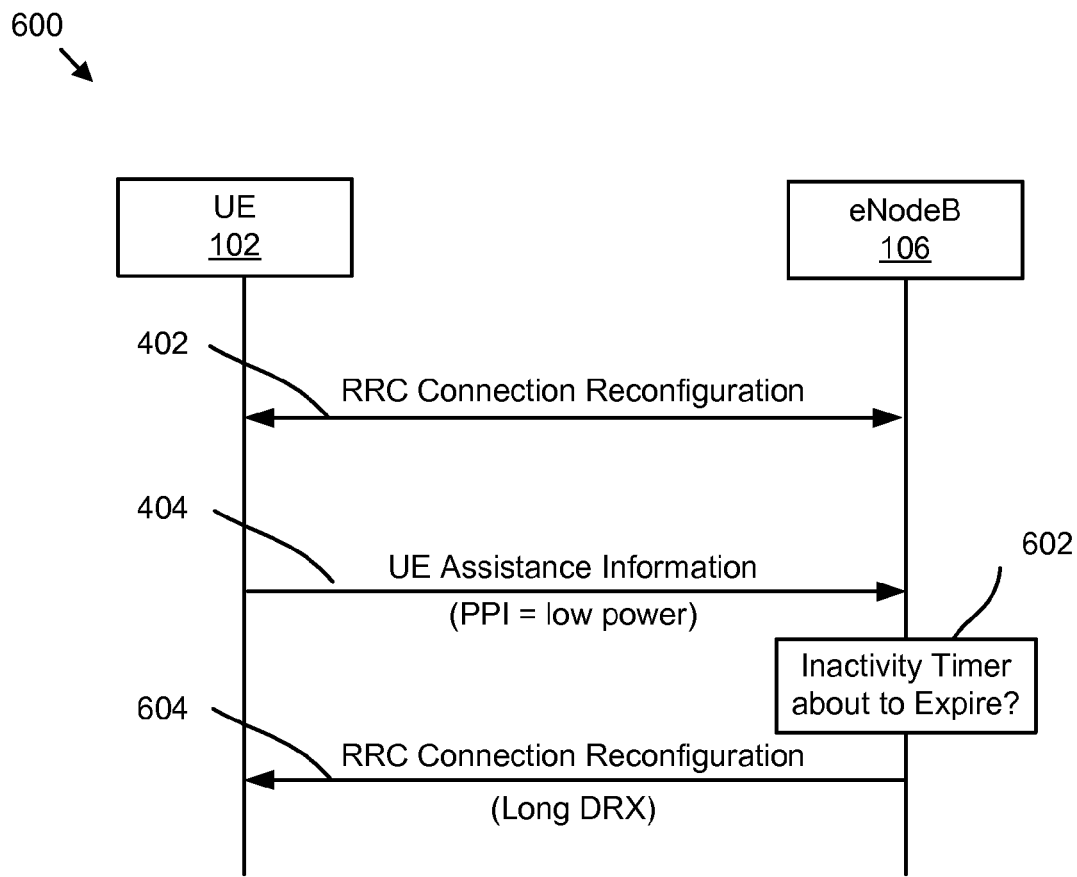
FIG. 6 is a diagram of a communication timeline illustrating communication to configure a UE for connected mode long discontinuous reception (DRX) consistent with embodiments disclosed herein.

FIG. 6 is a diagram of a communication timeline 600 illustrating communication between a UE 102 and an eNodeB 106 for processing assistance information to place a UE 102 in a long DRX cycle in connected mode.

The eNodeB 106 and the UE 102 reconfigure 402 a connection for the UE 102. Reconfiguration 402 of the connection may be performed in a manner similar to that discussed in relation to FIG. 4.

The UE 102 sends 404 UE assistance information to the eNodeB 106 indicating a power preference of the UE 102. The UE 102 may send 404 assistance information in the manner indicated and discussed in relation to FIGS. 4 and/or 5. For example, the assistance information may or may not include a timer length.

The eNodeB 106 may determine 602 whether an inactivity timer for the UE 102 is about to expire. The inactivity timer may be the inactivity timer run by the inactivity component 312. In one embodiment, the eNodeB 106 determines whether the inactivity timer is about to expire in response to receiving the assistance information sent 502 by the UE 102. The eNodeB 106 may determine that the inactivity timer for the UE is about to expire based on the inactivity timer falling below or reaching a preconfigured threshold value.

The eNodeB 106 reconfigures 604 a connection with the UE 102 for long DRX. The eNodeB 106 may reconfigure 604 the connection in response to receiving assistance information from the UE 102 and/or based on a determination that the inactivity timer is about to expire. If UE inactivity timer (running at eNodeB 106) is about to expire the eNodeB 106 reconfigure 604 the connection with the UE 102 for long DRX. The long DRX cycle may include a connected mode DRX cycle such that the UE 102 need not be disconnected or placed in an idle or paging mode. The eNodeB 106 may send an RRC Connection Reconfiguration message that includes long DRX information for connected mode. The long DRX information may include a DRX cycle longer than a short DRX cycle that is generally entered first and may thus lead to increased power savings. For example, the reconfiguration method message may cause the UE 102 to enter a low power mode according to the long DRX cycle without first entering a low power mode for a short DRX cycle. The UE 102 may reconfigure its connection settings to follow the long DRX cycle.

According to one embodiment, by placing the UE 102 in a long DRX cycle in response to receiving the assistance information, battery usage in the UE 102 and load on the eNodeB 106 may be reduced. For example, the UE 102 may not first be required to enter a short DRX cycle and then wait for a period of time before entering the long DRX cycle. Because the long DRX cycle increases the amount of time that the UE 102 can spend in a lower power mode and decreases the frequency and/or number of messages that must be handled or sent by the eNodeB 106, significant energy and load savings can result.

Figure 7:
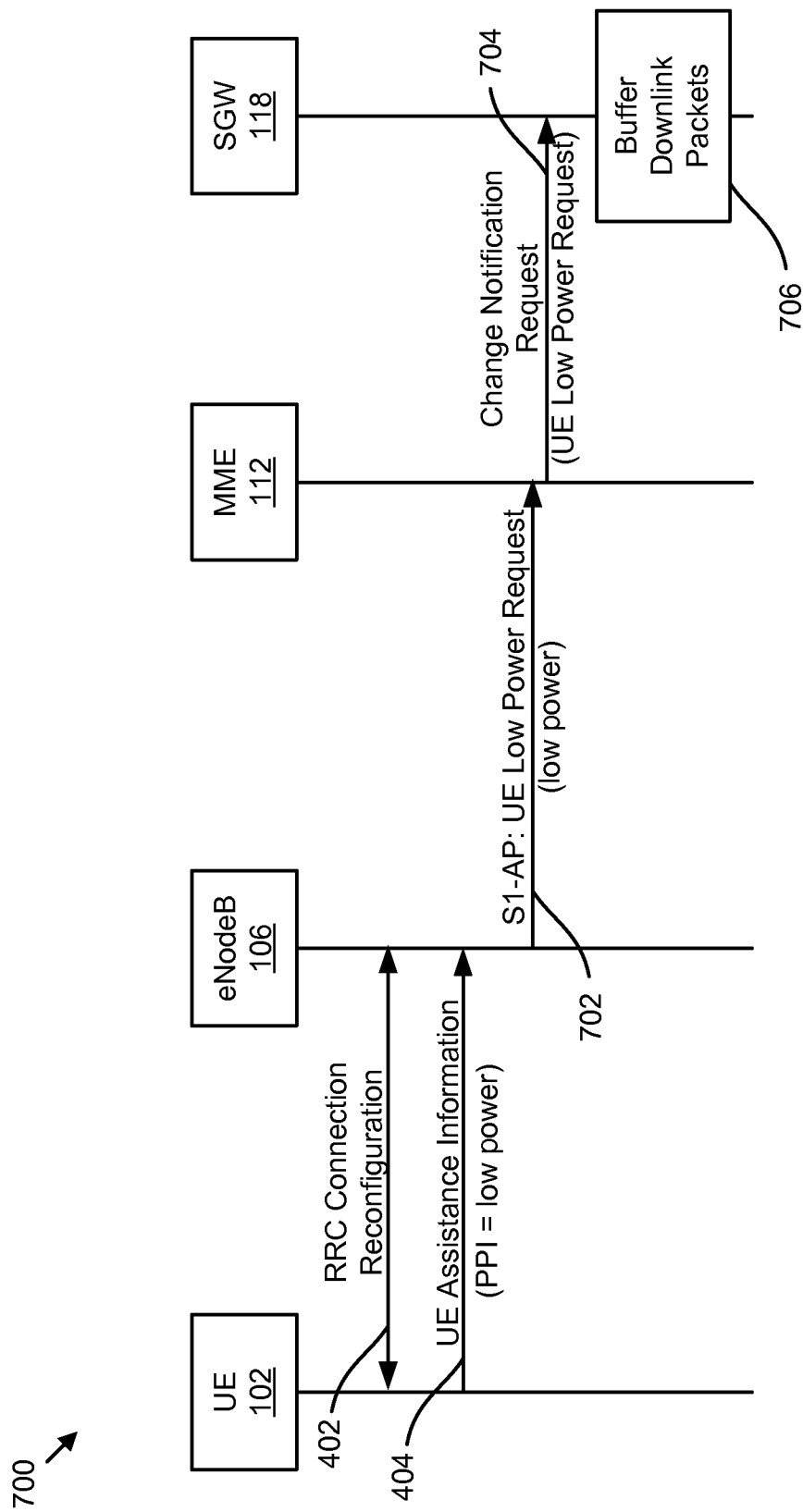
FIG. 7 is a diagram of a communication timeline illustrating communication to buffer downlink packets for a UE consistent with embodiments disclosed herein.

FIG. 7 is a diagram of a communication timeline 700 illustrating communication between a UE 102, eNodeB 106, MME 112, and SGW 118 for processing assistance information to buffer downlink packets for the UE 102.

The eNodeB 106 and the UE 102 reconfigure 402 a connection for the UE 102. Reconfiguration 402 of the connection may be performed in a manner similar to that discussed in relation to FIG. 4.

The UE 102 sends 404 UE assistance information to the eNodeB 106 to indicate a power preference of the UE 102. The UE 102 may send 404 assistance information in the manner indicated and discussed in relation to FIGS. 4 and 5. For example, the assistance information may or may not include a timer length.

The eNodeB 106 notifies 702 the MME 112 of the low power request by the UE 102. The eNodeB 106 may notify 702 the MME 112 of the low power preference of the UE by providing to the MME 112 a UE Low Power Request message that includes a low power indicator. The UE Low Power Request message may be a message defined within the S1 application protocol and may be configured to include information from the assistance information provided by the UE 102.

The MME 112 forwards 704 the low power request to the SGW 118. The MME 112 may forward 704 the low power request within a Change Notification Request message to the SGW 118. The Change Notification Request may be a GPRS tunneling protocol message such as a GTP-C message that has been enhanced to include the assistance information or new GTP-C message.

In response to receiving the change notification request, the SGW 118 may begin to buffer 706 downlink packets for the UE 102. In one embodiment, if the assistance information sent 404 by the UE includes a timer length, the SGW 118 buffers 706 the downlink packets for the timer length and then send the downlink packets when the timer expires. This may allow the UE 102 to enter a low power mode during the intervening time and then be available to receive the buffered packets. In another embodiment, a previously agreed upon or configured timer length is used during which the SGW 118 buffers 706 the downlink packets and the UE 102 enters a low power mode.

In one embodiment the UE 102 is not required to enter an idle or paging mode, but simply reduces battery usage due to the reduced number of received packets. Buffering downlink packets can prevent the UE 102 from toggling between a connected mode and an idle mode while reducing power consumption, in some embodiments. For example, repeatedly performing connect and release procedures may increase a load on a communication system 100 and/or increase energy consumption at the UE 102.

Figure 8:
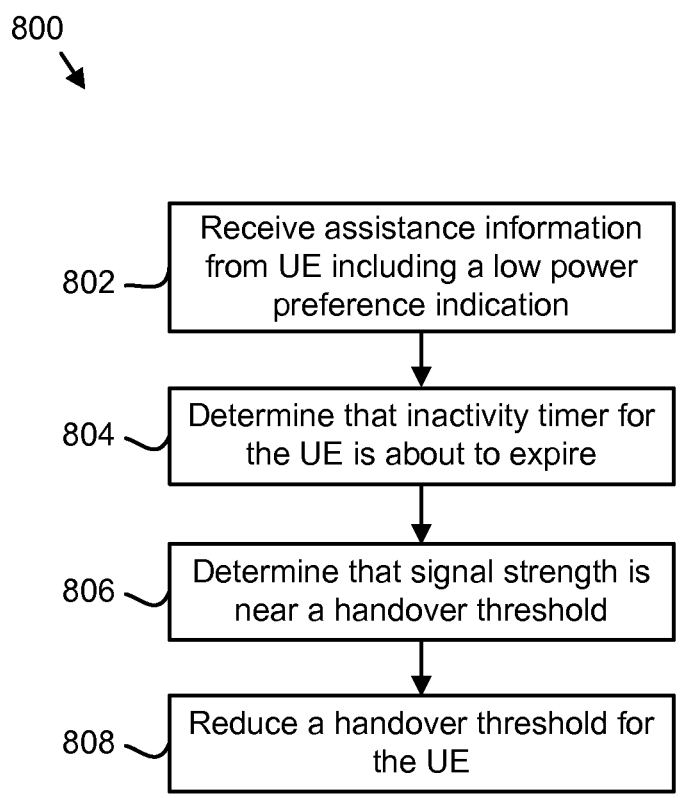
FIG. 8 is a flow chart of a method for establishing a direct path communication session consistent with embodiments disclosed herein.

FIG. 8 is a flow chart of a method 800 for processing assistance information to reduce a handover threshold. The method 800 may be performed by an eNodeB 106 or other component of a communication system 100.

An eNodeB 106 receives 802 assistance information from the UE 102. The assistance information includes a low power preference indication. The eNodeB 106 may receive 802 the assistance information in a manner indicated in FIGS. 4, 5, 6, and/or 7. For example, the eNodeB 106 may receive 802 the assistance information sent by the UE 102 in response to the UE 102 determining that it prefers a low power mode.

The eNodeB 106 determines 804 that an inactivity timer for the UE 102 is about to expire. For example, an inactivity timer started by the inactivity component 312 of the eNodeB 106 may be within a threshold time of expiring. In one embodiment, the inactivity timer is used to determine when a UE 102 should be placed in a low power mode or when a connection with the UE 102 may be released. Thus, if the inactivity timer is about to expire, the UE 102 may soon be released anyway.

The eNodeB 106 determines 806 that a signal strength of the UE 102 is near a handover threshold. For example, the handover component 310 may define a timing for handing over or transferring a communication session for a UE 102 based on the signal strength of the UE 102. In one embodiment, if the signal strength of the UE 102 is near the handover threshold, a handover of the UE 102 may be imminent. The eNodeB 106 may determine 806 that the signal strength is near the handover threshold by determining 806 whether the signal strength is within a defined dB or RSSI range of the handover threshold.

The eNodeB 106, in response to determining 804 that the inactivity timer is about to expire and determining 806 that the signal strength is near a handover threshold, may reduce 808 the handover threshold for the UE 102. For example, the signal strength that triggers a handover procedure for the UE 102 may be reduced such that handover or transfer of the UE 102 is delayed.

Figure 9:
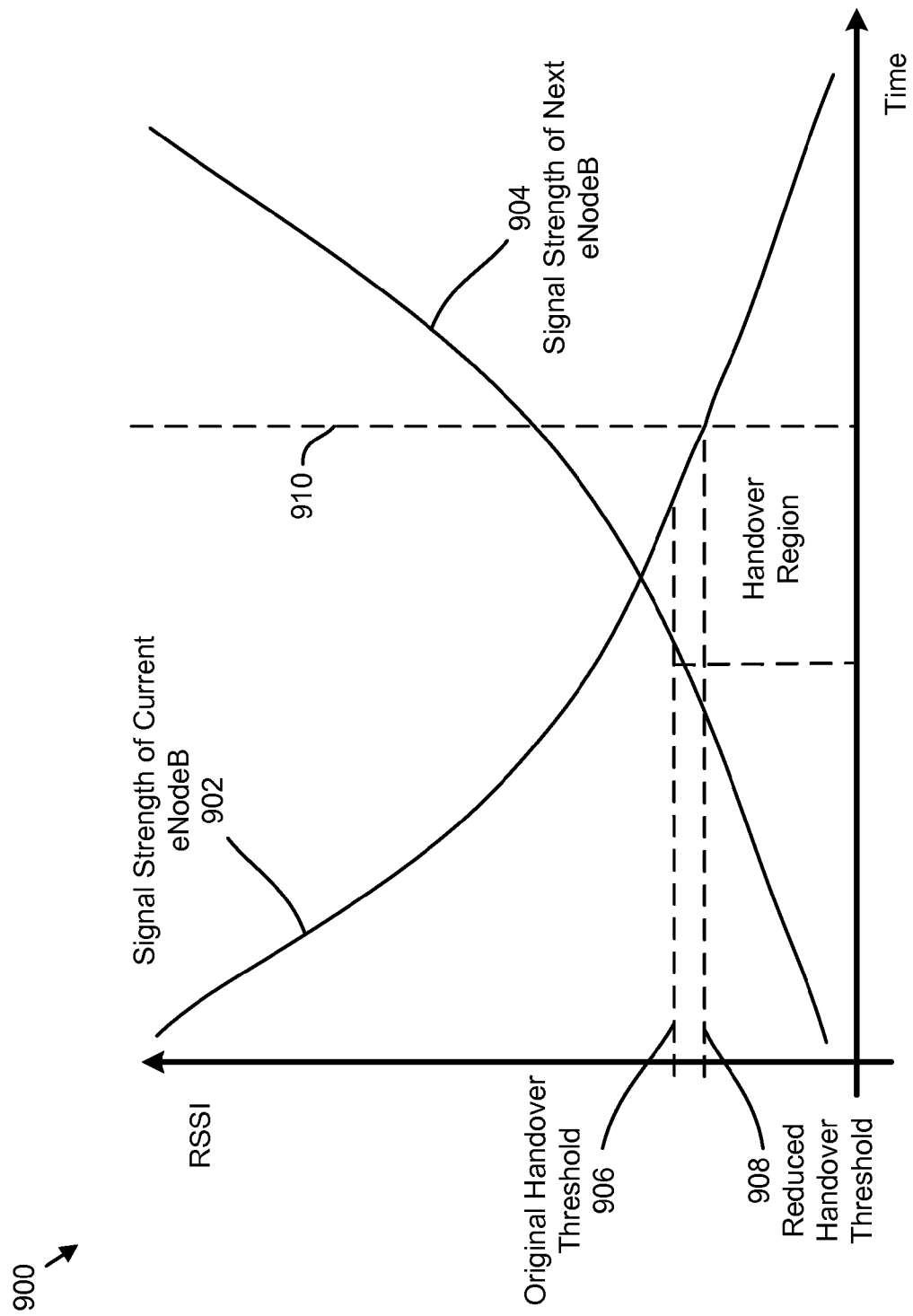
FIG. 9 is a signal strength graph illustrating a reduced handover threshold consistent with embodiments disclosed herein.

FIG. 9 is a signal strength graph 900 illustrating a reduction 808 of a handover threshold. The signal strength graph 900 depicts a first signal strength 902 for a current node and a second signal strength 904 for a next node. The signal strength graph 900 illustrates signal strength (RSSI) over time. As depicted, the first signal strength 902 for the current node is decreasing over time while the second signal strength 904 is increasing over time due to movement of the UE 102. Thus, over time it will be necessary and/or desirable to switch from a current node to a next node, such as from a first eNodeB to a second eNodeB or from a first cell to a second cell.

The signal strength graph 900 also illustrates an original handover threshold 906 and a reduced handover threshold 908. The original handover threshold 906 may be a threshold signal strength defined by the communication system 100 for when a handover should occur. In one embodiment, when the eNodeB 106 reduces 808 the handover threshold, it is reduced from the original handover threshold 906 to the reduced handover threshold 908. Reducing 808 the handover threshold results in a delayed timing for handing over the UE 102. For example, rather than being handed over where the original handover threshold 906 intersects the first signal strength 902, the UE 102 will be handed over only if (or until) the UE 102 remains in a connected or active mode until time 910, where the reduced handover threshold 908 intersects the first signal strength 902.

Because the inactivity timer is about to expire and the signal strength is near a handover threshold, the eNodeB 106 may be able to completely skip a handover procedure. This may reduce load on the eNodeB 106 and reduce energy consumption at the UE 102 because signaling for an unneeded handover procedure is avoided.

In one embodiment, the method 800 may also include checking for mobility of the UE 102 and/or for a load of the eNodeB 106.

Figure 10:
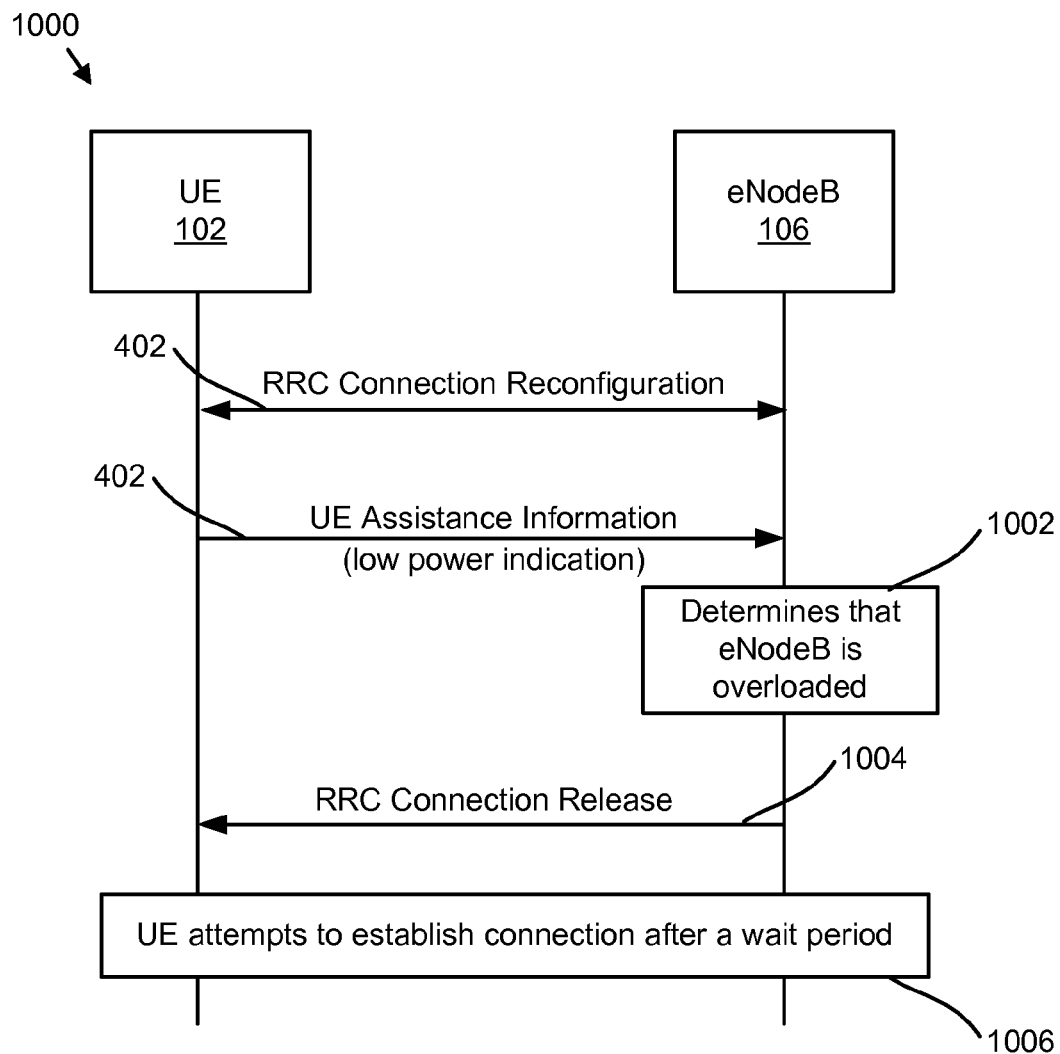
FIG. 10 is a diagram of a communication timeline illustrating communication to release a UE in response to assistance information consistent with embodiments disclosed herein.

FIG. 10 is a diagram of a communication timeline 1000 illustrating communication between a UE 102 and an eNodeB 106 for releasing a connection with a UE 102 in response to receiving assistance information.

The eNodeB 106 and the UE 102 reconfigure 402 a connection for the UE 102. Reconfiguration 402 of the connection may be performed in a manner similar to that discussed in relation to FIG. 4.

The UE 102 sends 404 UE assistance information to the eNodeB 106 indicating a power preference of the UE 102. The UE 102 may send 404 assistance information in the manner indicated and discussed in relation to FIGS. 4 and 5. For example, the assistance information may or may not include a timer length.

The eNodeB 106 determines 1002 that the eNodeB 106 is overloaded. For example, the load component 314 of the eNodeB 106 may determine that the eNodeB 106 is receiving more messages or requests than it is able to handle in a defined time period.

In response to determining 1002 that the eNodeB 106 is overloaded, the eNodeB 106 releases 1004 a connection with the UE 102. For example, the eNodeB 106 may release 1004 the UE 102 in a manner similar to that indicated in relation to FIG. 5.

Following a wait period, the UE 102 may attempt 1006 to establish a connection with the eNodeB 106 or other eNodeB 106. The wait period may be a defined wait period provided to the UE 102 by the eNodeB 106 or communication system 100, or may be a random amount of time until the UE 102 is in need of access to the communication system 100. For example, a user event or other event at the UE 102 may initiate connection to the communication system 100.

According to one embodiment, release of a UE 102 that is requesting a low power mode when an eNodeB 106 is overloaded may help the eNodeB 106 provide better service for UEs 102 that are requesting service. For example, if a large number of UEs 102 are on the same eNodeB 106, the eNodeB 106 may become overloaded and may not be able to support all calls or data requests by the UEs 102. By releasing UEs 102 that are requesting a low power mode, and probably do not have a very strong need for data or quick responses to user requests for voice or data connections, the eNodeB 106 can prioritize which UEs 102 are truly in active use and thereby meet their needs first.

Figure 11:
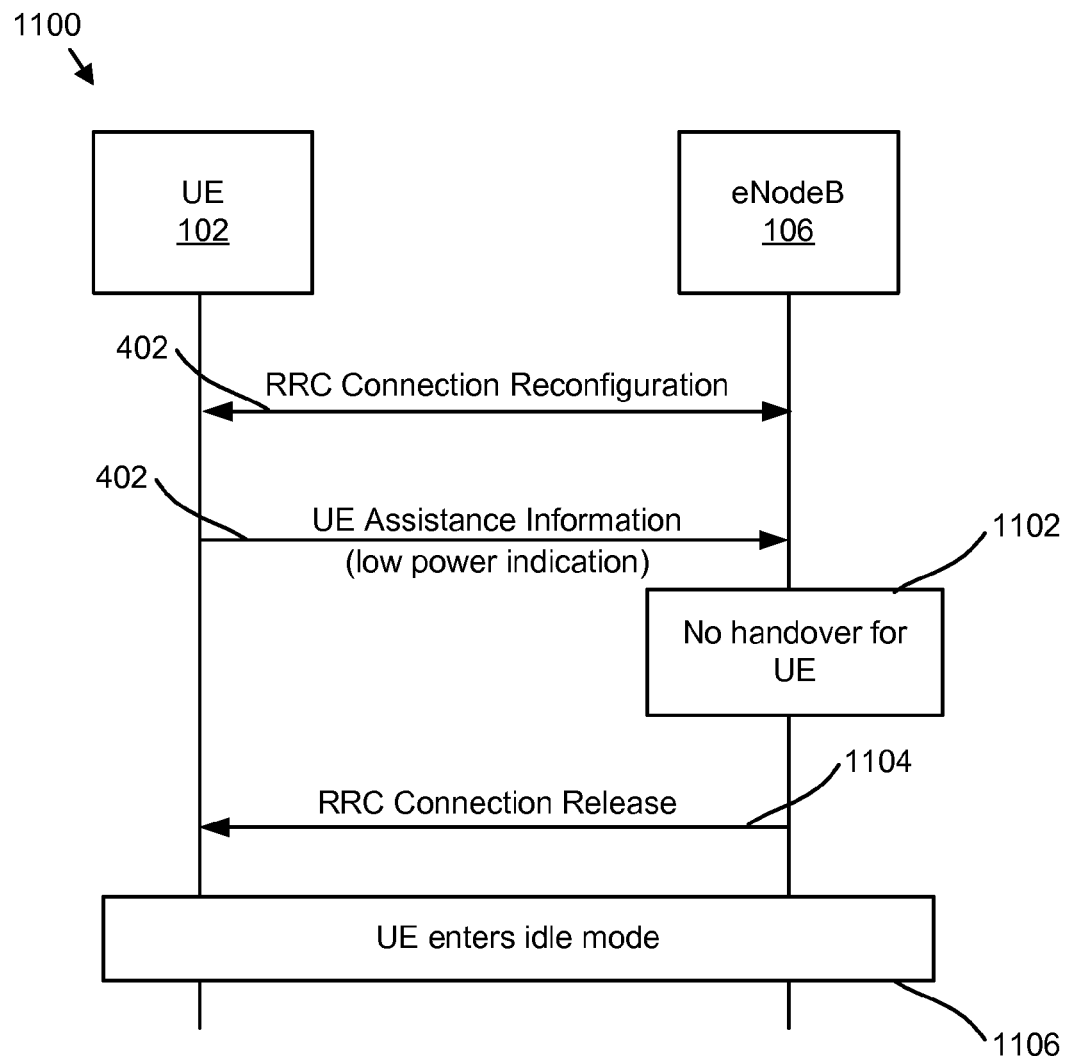
FIG. 11 is another diagram of a communication timeline illustrating communication to release a UE in response to assistance information consistent with embodiments disclosed herein.

FIG. 11 is a diagram of a communication timeline 1100 illustrating communication between a UE 102 and an eNodeB 106 for determining that a UE 102 should not be handed over to a new cell or eNodeB 106.

The eNodeB 106 and the UE 102 reconfigure 402 a connection for the UE 102. Reconfiguration 402 of the connection may be performed in a manner similar to that discussed in relation to FIG. 4.

The UE 102 sends 404 UE assistance information to the eNodeB 106 indicating a power preference of the UE 102. The UE 102 may send 404 assistance information in the manner indicated and discussed in relation to FIGS. 4 and 5. For example, the assistance information may or may not include a timer length.

In response to receiving the assistance information, the eNodeB 106 determines 1102 that the UE 102 will not be handed over to a next cell or eNodeB 106. For example, the eNodeB 106 may be able to save handover signaling by simply releasing a connection with the UE 102. The determination 1102 that the UE 102 will not be handed over may be made based only on the assistance information or may also be made in relation to a mobility of the UE 102, a load of the eNodeB 106, or the like. For example, the eNodeB 106 may determine 1102 that no handover will be made based on the current eNodeB 106 being overloaded and/or based on a next or target eNodeB 106 being overloaded.

The eNodeB 106 releases 1104 a connection with the UE 102. For example, the eNodeB 106 may release 1104 the UE 102 in a manner similar to that indicated in relation to the release 1004 of FIG. 10 or similar to the method of FIG. 5.

The UE 102 may then enter 1106 idle mode (RRC_IDLE) in response to the RRC connection release 1104.

Figure 12:
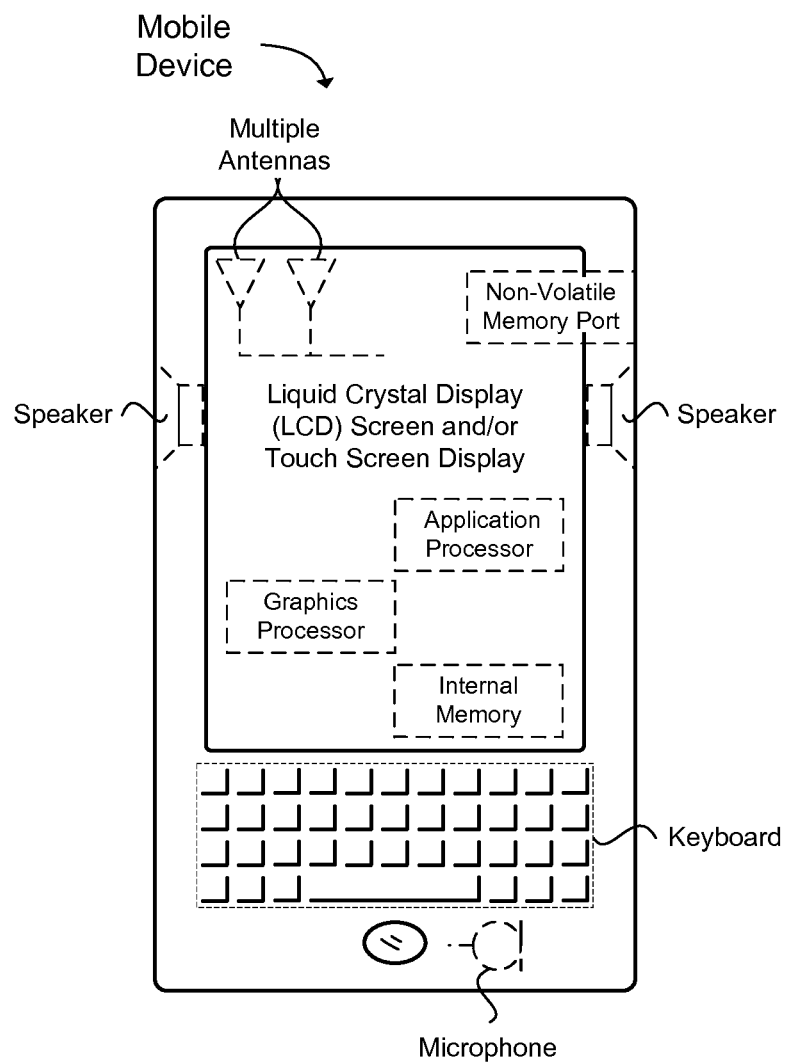
FIG. 12 is a schematic diagram of a mobile device consistent with embodiments disclosed herein.

FIG. 12 provides an example illustration of a mobile device, such as a user equipment (UE), a mobile station (MS), a mobile wireless device, a mobile communication device, a tablet, a handset, or another type of mobile wireless device. The mobile device can include one or more antennas configured to communicate with a transmission station, such as a base station (BS), an evolved Node B (eNodeB), a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 12 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is an eNodeB that provides a connection reconfiguration message to a UE connected to the eNodeB. The connection reconfiguration message configures the UE to indicate a power preference. The eNodeB receives assistance information from the UE. The assistance information includes a low power preference indication and a timer length. The timer length indicates a preferred duration for a low power mode. The eNodeB provides, in response to receiving the assistance information, a connection release message to the UE. The connection release message includes the timer length.

In Example 2, the eNodeB of Example 1 can optionally provide a context release request comprising the low power preference indication and the timer length to an MME.

In Example 3, the eNodeB of Examples 1-2 can optionally provide the context release request to the MME to initiate performance of a release access bearer procedure by the MME and an SGW.

In Example 4, the eNodeB of Examples 1-3 can optionally provide the connection release message to the UE in response to receiving a context release command from the MME. The context release command may indicate performance of the release access bearer procedure. The context release command may include paging DRX information including a length of the paging DRX cycle and further include the timer length indicating how long the UE will stay in the low power mode.

In Example 5, the eNodeB of Examples 1-4 can optionally provide the context release request comprising the timer length to initiate a timer at the MME for the timer length to defer paging to the UE.

In Example 6, the eNodeB of Examples 1-5 can optionally determine that the eNodeB is overloaded. The connection release message may be provided to the UE in response to determining that the eNodeB is overloaded.

In Example 7, the eNodeB of Examples 1-6 can optionally provide the low power indication and the timer length to an SGW for buffering of downlink packets for the UE at the SGW for the timer length.

In Example 8, the eNodeB of Examples 1-7 can optionally receive buffered downlink packets for the UE after the time length and provide the buffered downlink packets to the UE.

Example 9 is a UE that includes a transceiver component, an assistance information component, and a power mode component. The transceiver component is configured to receive a first RRC connection reconfiguration message from a wireless base station. The first RRC connection reconfiguration message is to reconfigure the UE to indicate a power preference. The assistance information component is configured to provide assistance information to the wireless base station. The assistance information includes a low power preference indication. The power mode component is configured to control a power mode of the UE. The transceiver component is further configured to receive, in response to providing the assistance information, a second RRC connection reconfiguration message including DRX information indicating a long DRX cycle.

In Example 10, the power mode component of Example 9 is optionally configured to cause, in response to receiving the second RRC connection reconfiguration message, the UE to enter a low power mode according to the long DRX cycle without first entering a low power mode for a short DRX cycle.

In Example 11, the power mode component of Examples 9-10 can be optionally configured to cause the UE to enter a low power mode by powering off a portion of the transceiver component based on the long DRX cycle. The portion of the transceiver component that is powered of includes transceiver circuitry and processing circuitry that is not required for maintaining radio state information of the UE.

In Example 12, the power mode component of Examples 9-11 is further optionally configured to cause the UE to enter a low power mode based on the long DRX cycle. The power mode component cause the UE to maintain a connected mode with the wireless base station that includes an eNodeB. The power mode component may cause the UE to enter an idle mode.

In Example 13, the power mode component of Examples 9-12 is optionally further configured to determine that the UE should enter a low power mode. The UE may provide the assistance information comprising the low power preference indication in response to determining that the UE should enter the low power mode.

In Example 14, the power mode component of Examples 9-13 is further configured to determine a timer length for the UE to be in a low power mode. The assistance information component may be configured to provide the timer length with the assistance information.

Example 15 is an eNodeB that includes an assistance information component, a signal strength component, a handover component, and a connection component. The assistance information component is configured to receive assistance information from user equipment (UE) connected to the eNodeB. The assistance information includes a low power preference indication. The signal strength component is configured to determine that a signal strength of the UE is near a handover threshold. The handover component is configured to modify a handover procedure for the UE based on the assistance information. The connection component is configured to provide, in response to receiving the assistance information, a connection release message to the UE.

In Example 16, the eNodeB of Example 15 optionally further includes an inactivity component configured to determine that an inactivity timer for the UE is about to expire. The handover component may modify the handover procedure by reducing the handover threshold for the UE.

In Example 17, the connection component of Example 15-16 can optionally provide the connection release information to the UE in response to expiration of the inactivity timer.

In Example 18, the eNodeB of Examples 15-17 can optionally include a load component configured to determine that the eNodeB is overloaded. The handover component may modify the handover procedure by not handing over the UE to a next eNodeB.

In Example 19, the signal strength component of Examples 15-18 is optionally configured to determine that the signal strength of the UE has reached the handover threshold. The connection component may provide the connection release message in response to the signal strength reaching the handover threshold.

In Example 20, the assistance information of Examples 15-19 optionally includes a timer length indicating a preferred time length for the UE to be in a low power mode. The connection component may provide the connection release message comprising paging DRX information based on the timer length.

Example 21 is a method for processing assistance information. The method includes providing a connection reconfiguration message to UE connected to an eNodeB. The connection reconfiguration message configures the UE to indicate a power preference. The method includes receiving assistance information from the UE. The assistance information includes a low power preference indication and a timer length. The timer length indicates a preferred duration for a low power mode. The method includes providing, in response to receiving the assistance information, a connection release message to the UE. The connection release message includes the timer length.

In Example 22, the method of Example 21 can optionally include providing a context release request comprising the low power preference indication and the timer length to an MME.

In Example 23, the method of Examples 21-22 can optionally include providing the context release request to the MME to initiate performance of a release access bearer procedure by the MME and an SGW.

In Example 24, the method of Examples 21-23 can optionally include providing the connection release message to the UE in response to receiving a context release command from the MME. The context release command may indicate performance of the release access bearer procedure. The context release command may include paging DRX information including a length of the paging DRX cycle and further include the timer length indicating how long the UE will stay in the low power mode.

In Example 25, the method of Examples 21-24 can optionally include providing the context release request including the timer length to initiate a timer at the MME for the timer length to defer paging to the UE.

In Example 26, the method of Examples 21-25 can optionally include determining that the eNodeB is overloaded. The connection release message may be provided to the UE in response to determining that the eNodeB is overloaded.

In Example 27, the method of Examples 21-26 can optionally include providing the low power indication and the timer length to an SGW for buffering of downlink packets for the UE at the SGW for the timer length.

In Example 28, the method of Examples 21-27 can optionally include receiving buffered downlink packets for the UE after the time length and provide the buffered downlink packets to the UE.

Example 29 is a method for indicating a power preference by a UE. The method includes receiving a first RRC connection reconfiguration message from a wireless base station. The first RRC connection reconfiguration message is to reconfigure the UE to indicate a power preference. The method includes providing assistance information to the wireless base station. The wireless information includes a low power preference indication. The method includes controlling a power mode of the UE. The method also includes receiving, in response to providing the assistance information, a second RRC connection reconfiguration message comprising DRX information indicating a long DRX cycle.

In Example 30, the method of Example 29 can optionally include causing, in response to receiving the second RRC connection reconfiguration message, the UE to enter a low power mode according to the long DRX cycle without first entering a low power mode for a short DRX cycle.

In Example 31, the method of Examples 29-30 can optionally include causing the UE to enter a low power mode by powering off a portion of the UE based on the long DRX cycle. The portion of the UE that is powered of includes transceiver circuitry and processing circuitry that is not required for maintaining radio state information of the UE.

In Example 32, the method of Examples 29-31 can optionally include causing the UE to enter a low power mode based on the long DRX cycle. The method may include causing the UE to maintain a connected mode with the wireless base station that includes an eNodeB. The method may include causing the UE to enter an idle mode.

In Example 33, the method of Examples 29-32 can optionally include determining that the UE should enter a low power mode. The UE may provide the assistance information comprising the low power preference indication in response to determining that the UE should enter the low power mode.

In Example 34, the method of Examples 29-33 can optionally include determining a timer length for the UE to be in a low power mode. The method may include providing the timer length with the assistance information.

Example 35 is a method for processing assistance information. The method includes receiving assistance information from UE connected to an eNodeB. The assistance information comprises a low power preference indication. The method includes determining that a signal strength of the UE is near a handover threshold. The method includes modifying a handover procedure for the UE based on the assistance information. The method includes providing, in response to receiving the assistance information, a connection release message to the UE.

In Example 36, the method of Example 35 optionally further includes determining that an inactivity timer for the UE is about to expire. Modifying may include modifying the handover procedure by reducing the handover threshold for the UE.

In Example 37, the method of Example 35-36 can optionally include providing the connection release information to the UE in response to expiration of the inactivity timer.

In Example 38, the method of Examples 35-37 can optionally include determining that the eNodeB is overloaded. Modifying may include modifying the handover procedure by not handing over the UE to a next eNodeB.

In Example 39, the method of Examples 35-38 can optionally include determining that the signal strength of the UE has reached the handover threshold. The method may include providing the connection release message in response to the signal strength reaching the handover threshold.

In Example 40, the assistance information of Examples 35-39 can optionally include a timer length indicating a preferred time length for the UE to be in a low power mode. The method may include providing the connection release message comprising paging DRX information based on the timer length.

In Example 41, an apparatus may include means to perform a method of Examples 21-40.

In Example 42, a machine readable storage medium that includes machine-readable instructions which, when executed, implement a method or realize an apparatus of any of Examples 1-41.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, a network device, a cellular phone, a PDA, a manufacturing tool, any device with one or more processors, etc.). For example, a machine-accessible medium includes recordable/non-recordable media (e.g., read-only memory (ROM), random access memory (RAM), magnetic disk storage media, optical storage media, flash memory devices, etc.).

The term "logic," as used herein, can include, for example, special-purpose hardwired circuitry, software and/or firmware in conjunction with programmable circuitry, or a combination thereof.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. An evolved node B (eNodeB) comprising:
a wireless transceiver configured to communicate with a user equipment (UE);
a processor coupled to the wireless transceiver and configured to:
transmit a connection reconfiguration message to the UE connected to the eNodeB, the connection reconfiguration message configuring the UE to transmit assistance information that includes a power preference indicator;
receive the assistance information from the UE in response to the connection reconfiguration message, wherein the assistance information comprises the power preference indicator for low power and a timer length, wherein the timer length indicates a preferred duration for a low power mode;
transmit, in response to receiving the assistance information, a connection release message to the UE, the connection release message comprising the timer length; and
provide a context release request comprising the low power preference indication and the timer length to a mobility management entity (MME).

2. The eNodeB of claim 1, wherein the eNodeB provides the context release request to the MME to initiate performance of a release access bearer procedure by the MME and a serving gateway (SGW).

3. The eNodeB of claim 2, wherein the eNodeB provides the connection release message to the UE in response to receiving a context release command from the MME, the context release command indicating performance of the release access bearer procedure, the context release command comprising paging DRX information comprising a length of the paging DRX cycle and further comprising the timer length indicating how long the UE will stay in the low power mode.

4. The eNodeB of claim 1, wherein the eNodeB provides the context release request comprising the timer length to initiate a timer at the MME for the timer length to defer paging to the UE.

5. The eNodeB of claim 1, further configured to determine that the eNodeB is overloaded, wherein the connection release message is provided to the UE in response to determining that the eNodeB is overloaded.

6. The eNodeB of claim 1, further configured to provide the low power indication and the timer length to a serving gateway (SGW) for buffering of downlink packets for the UE at the SGW for the timer length.

7. The eNodeB of claim 6, wherein the eNodeB is configured to receive buffered downlink packets for the UE after the time length and provide the buffered downlink packets to the UE.

* * * * *